United States Patent
Fujita et al.

(10) Patent No.: US 8,416,671 B2
(45) Date of Patent: Apr. 9, 2013

(54) RECORDING APPARATUS

(75) Inventors: Goro Fujita, Kanagawa (JP); Tsutomu Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 48 days.

(21) Appl. No.: 13/225,615

(22) Filed: Sep. 6, 2011

(65) Prior Publication Data

US 2012/0063288 A1    Mar. 15, 2012

(30) Foreign Application Priority Data

Sep. 13, 2010  (JP) ................................. 2010-204838

(51) Int. Cl.
*G11B 7/00*    (2006.01)

(52) U.S. Cl.
USPC ........................................ 369/116; 369/47.19

(58) Field of Classification Search .................. 369/116, 369/121, 122, 47.5, 47.51, 47.19
See application file for complete search history.

(56) References Cited

U.S. PATENT DOCUMENTS

| | | | |
|---|---|---|---|
| 6,160,776 A * | 12/2000 | Seo .............................. | 369/47.1 |
| 2002/0012300 A1 * | 1/2002 | Kim ............................ | 369/47.31 |
| 2004/0052174 A1 * | 3/2004 | Hayashi et al. ............. | 369/47.22 |
| 2005/0141373 A1 * | 6/2005 | Kaneshige et al. ........ | 369/47.27 |
| 2007/0070834 A1 * | 3/2007 | Masui et al. ................ | 369/44.11 |
| 2009/0109809 A1 * | 4/2009 | Kuroda et al. .............. | 369/44.23 |
| 2010/0157780 A1 * | 6/2010 | Hayashi et al. ............ | 369/124.14 |
| 2010/0271928 A1 * | 10/2010 | Yamazoe ...................... | 369/122 |
| 2011/0234744 A1 * | 9/2011 | Fujita et al. ................ | 372/46.01 |

OTHER PUBLICATIONS

Kobayashi, Seiji et al., "Introduction of volumetric optical storage technology "Micro-reflector", an ultra-multilayer optical disk", Th-I-01 ISOM Digest, 2009, Kanagawa, Japan.

Kuramoto, Masaru, et al., "Enormously high-peak-power optical pulse generation from a single-transverse-mode GaInM blue-violet laser diode", Applied Physics Letters, 2010, vol. 96, American Institute of Physics, Japan.

Koda, Rintaro et al., "100 W peak-power 1 GHz repetition picoseconds optical pulse generation using blue-violet GaInN diode laser mode-locked oscillator and optical amplifier", Applied Physics Letters, 2010, vol. 97, American Institute of Physics, Japan.

Spectra-Physics Tsunami Series Data Sheet, 2008.

* cited by examiner

*Primary Examiner* — Thang Tran
(74) *Attorney, Agent, or Firm* — Wolf, Greenfield & Sacks, P.C.

(57) ABSTRACT

A recording apparatus for recording information on an optical recording medium includes a mode-locked laser unit that includes a semiconductor laser emitting a laser beam for recording the information on the optical recording medium, and an external resonator, an optical modulation unit that amplifies and modulates the laser beam emitted from the mode-locked laser unit, a recording signal generation unit that generates a recording signal based on a reference signal from a drive of the optical recording medium, and a modulation unit that generates a modulation signal for driving the optical modulation unit by latching the recording signal using a laser clock generated by an oscillation pulse of the laser beam emitted from the mode-locked laser unit.

4 Claims, 10 Drawing Sheets

RECORDING APPARATUS

BACKGROUND

The present disclosure relates to a recording apparatus using an MOPA (Master Oscillator Power Amplifier) for combining a mode-locked oscillation laser and an optical amplifier as a light source for recording.

A laser beam of high peak power, particularly, an ultra-short pulse beam is very effective to realize a nonlinear multi-photon absorption process.

It is expected to be applied to three-dimensional optical recording, ultrafine machining, non-destructive bioimaging, or the like which uses the absorption process.

For example, a method in which a transparent bulk material having a non-liner effect is irradiated with a laser beam of high output to thereby realize multilayer recording has been reported (see, ISOM2009 Digest Th-l-01, 2009, Seiji Kobayashi, Kimihiro Saito, Takashi Iwamura, Hisayuki Yamatsu, Toshihiro Horigome, Mitsuaki Oyamada, Kunihiko Hayashi, Daisuke Ueda, Norihiro Tanabe, and Hirotaka Miyamoto).

In this method, in comparison with the stacked disk in the related art, an inexpensive high-capacity recording medium may be realized.

Further, as the light source for emitting the laser beam of high output, a mode-locked titanium sapphire laser is used. In an example of ISOM2009 Digest Th-l-01, 2009, Seiji Kobayashi, Kimihiro Saito, Takashi Iwamura, Hisayuki Yamatsu, Toshihiro Horigome, Mitsuaki Oyamada, Kunihiko Hayashi, Daisuke Ueda, Norihiro Tanabe, and Hirotaka Miyamoto, emitted light of 810 nm of the titanium sapphire laser is converted into a wavelength of 405 nm by a SHG (Second Harmonic Generator), so that the converted wavelength is used as a light source which is advantageous to high-density recording.

In the case of the above described large and expensive solid-state laser, it is limited to applications to experiments executed in the laboratory (for example, see Corporation Spectra-Physics, [online], [Aug. 6, 2010 Search] Internet i_Series_Data_Sheet.pdf>.

Therefore, many researchers have attempted to develop a more compact and stable pulse light source based on a semiconductor for the purpose of practical use.

Similar to the above described method, in optical recording of the next generation, a blue-violet laser light source that is advantageous to the high-density recording of all semiconductors is strongly desired.

For example, it has been reported that a gain-switching laser realizes a peak power of 55 W when repeatedly performed at 1 MHz by strong excitation driving (see, Appl. Phys. Lett. 96, 051102 _2010, _M. Kuramoto, T. Oki, T. Sugahara, S. Kono, M. Ikeda, and H. Yokoyama).

However, in response to market demand for a high data transfer rate, a higher repetition frequency is necessary even in the light source for data recording.

Recently, in the blue laser light source that is advantageous for high-density recording, a light source of 100 W at a repetition frequency of 1 GHz has been reported (for example, see, APPLIED PHYSICS LETTERS 97, 021101 _ 2010, Rintaro Koda, Tomoyuki Oki, Takao Miyajima, Hideki Watanabe, Masaru Kuramoto, Masao Ikeda, and Hiroyuki Yokoyama).

The light source includes a semiconductor mode-locked laser and a semiconductor optical amplifier in a configuration called an MOPA (Master Oscillator Power Amplifier).

In a recording reproduction apparatus, recording data is obtained such that a recording address is applied for each recording unit in advance, and data is recorded in a corresponding position based on a wobble signal in which address information is embedded on an optical recording medium in advance. Thus, it is possible to reproduce target desired data by accessing a beam using the address information at the time of reproduction.

In an optical disc for recording, for example, a DVD or a Blu-ray disc (registered trademark), the optical recording medium is irradiated with a laser pulse in which a data clock is generated using a fundamental wave of the wobble signal in which the address information is embedded, and a modulation of the recording data is applied by being synchronized with the data clock.

Even in a case of using an MPOA light source in recording, for modulation of the recording data and an oscillation pulse of the laser it is necessary to perform recording while being subjected to synchronization.

SUMMARY

In a case in which the MOPA using the mode-locked oscillation laser is applied to the recording reproduction apparatus, it is possible to perform the modulation of the recording data by external driving of an optical amplifier which is a power amplifier.

However, in a case in which the MOPA is applied to the recording reproduction apparatus, when the oscillation pulse and modulation signal of the laser beam are not synchronized, the number of recording pulses is changed, so that a mark is not desirably written.

The present disclosure is to solve the above problem, and it is desirable to provide a recording apparatus that may readily obtain synchronization of the oscillation pulse and the modulation signal of the laser beam in a simple and easy configuration.

According to a first embodiment of the present disclosure, there is provided a recording apparatus that may record information on an optical recording medium.

In addition, the disclosure includes the mode-locked laser unit which includes a semiconductor laser that emits a laser beam for recording information on the optical recording medium, and an external resonator.

In addition, the recording apparatus includes an optical modulation unit that amplifies and modulates the laser beam emitted from the mode-locked laser unit, and a recording signal generation unit that generates a recording signal based on a reference signal from a drive of the optical recording medium.

Further, the recording apparatus includes a modulation unit that latches the recording signal using a laser clock generated by an oscillation pulse of the laser beam emitted from the mode-locked laser unit, and generates a modulation signal for driving the optical modulation unit.

In the above described recording apparatus of the present disclosure, in the modulation unit, the recording signal is latched by the laser clock that is generated by the oscillation pulse of the laser beam emitted from the mode-locked laser unit, so that the modulation signal is generated for driving the optical modulation unit. Thus, it is possible to synchronize the modulation signal for driving the optical modulation unit with the laser clock.

In addition, the laser beam emitted from the mode-locked laser unit in the optical modulation unit is amplified and modulated by driving the optical modulation unit by the modulation signal, so that the oscillation pulse of the laser beam and the modulation signal of the laser beam are synchronized.

As described above, it is possible to synchronize the oscillation pulse and the modulation signal of the laser beam, so that an optical pulse of the laser beam and the modulation signal of the laser beam are readily synchronized even in a case of the laser beam having a significantly high pulse light frequency.

Thus, it is possible to accurately realize high-density and high-speed recording.

DETAILED DESCRIPTION OF EMBODIMENTS

Hereinafter, best embodiments (hereinafter, referred to as embodiments) for carrying out the present disclosure will now be described. Further, the description will be made in the following order:

1. First embodiment
2. Second embodiment
1. First embodiment

Figure 1:
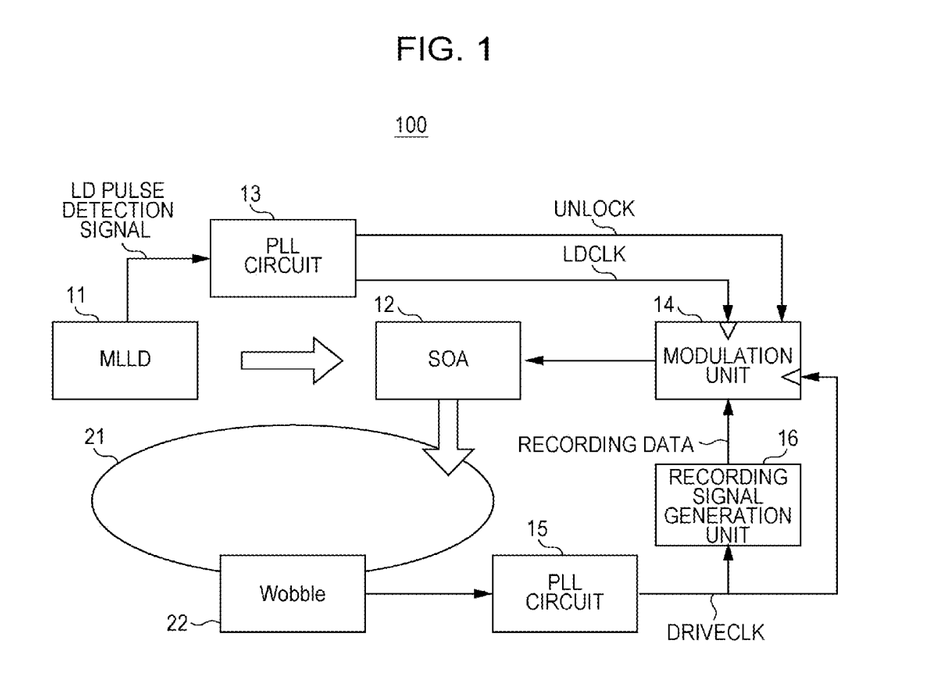
FIG. 1 is a schematic configuration diagram of a first embodiment of a recording apparatus of the present disclosure.

In FIG. 1, a schematic configuration diagram of a first embodiment of a recording apparatus of the present disclosure is shown.

The recording apparatus 100 shown in FIG. 1 includes a mode-locked laser unit 11 (MLLD unit), and an SOA (Semiconductor Optical Amp), that is, a semiconductor optical amplifier 12. In addition, the recording apparatus 100 includes a PLL circuit 13, a modulation unit 14, a PLL circuit 15, and a data generation unit 16 (recording signal generation unit). Further, the recording apparatus 100 includes a variety of circuits and a variety of optical components which are not shown.

Figure 2A:
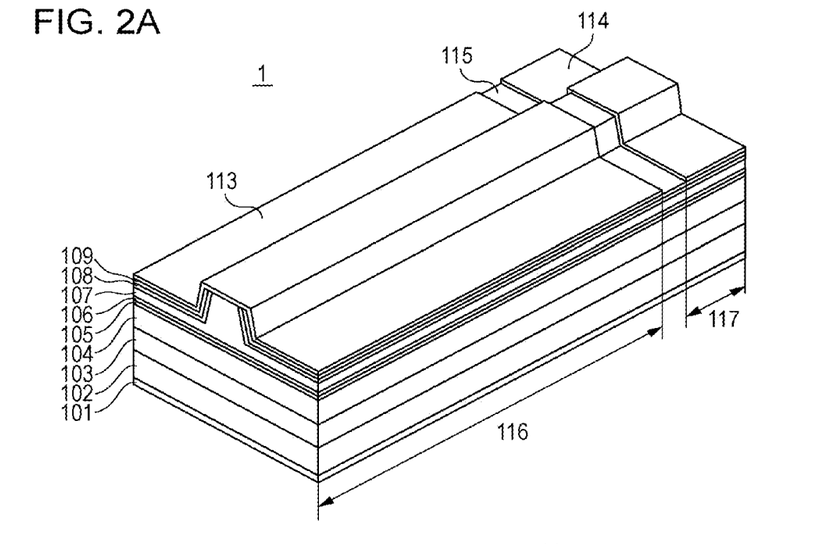
FIGS. 2A and 2B are schematic configuration diagrams of a first embodiment of a semiconductor laser of FIG. 1.
Figure 2B:
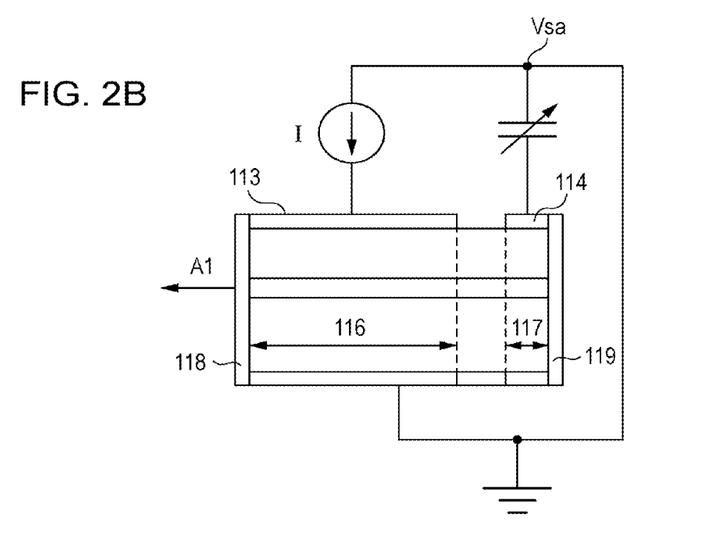

The mode-locked laser unit 11 includes a semiconductor laser and an external resonator. Here, in FIGS. 2A and 2B, schematic configuration diagrams of a first embodiment of the semiconductor laser constituting the mode-locked laser unit 11 of FIG. 1 are shown. FIG. 2A shows a perspective diagram of the semiconductor laser, and FIG. 2B shows a schematic diagram of a state in which a laser beam is emitted from the semiconductor laser. As shown in FIGS. 2A and 2B, the semiconductor laser 1 includes a gain section 116 and oversaturated absorber section 117. That is, the semiconductor laser 1 is a BS (bisectional) semiconductor laser. When the oversaturated absorber section 117 is provided, intensity of light incident on the absorber becomes large resulting in a reduction in light absorbance, so that only a pulse with a large intensity is transmitted, thereby obtaining a narrower pulse. In addition, gain current is injected into the gain section 116.

On an n-type GaN substrate 102, an n-type GaN layer 103, an n-type cladding layer 104, an active layer 105, a p-type electron barrier layer 106, and a p-type cladding layer 107 are stacked.

A ridge structure is formed in a center of the p-type cladding layer 107 as shown in FIG. 2A. In addition, on a ridge side or a part in which the ridge of the p-type cladding layer 107 is not formed, a $SiO_2$ layer 108 and a Si layer 109 are formed.

On the p-type cladding layer 107 and the Si layer 109, p-type electrodes 113 and 114 are formed by ohmic contact. That is, a main electrode 113 is formed on the gain unit 116, and a sub-electrode 114 is formed on the oversaturated absorber section 117. The electrodes 113 and 114 are divided by, for example, a groove-shaped separating unit 115 having a width of 20 μm, and are electrically separated from each other. The lengths of the main electrode 113 and the sub-electrode 114 are respectively 520 μm and 60 μm. In addition, an n-type lower electrode 101 is formed on a lower surface of the n-type GaN substrate 102 by ohmic contact.

In addition, an antireflection film 118 (see, FIG. 2B) is coated on a cleavage plane of a front surface of the gain unit 116, and a high reflection film 119 (see, FIG. 2B) is coated on a cleavage plane of a rear surface of the oversaturated absorber section 117.

As shown in FIG. 2B, in the semiconductor laser 1, a reverse-bias voltage Vsa is added to the oversaturated absorber section 117 by the sub-electrode 114. In this instance, by injecting current I from the main electrode 113 to the gain unit 116, a laser beam is emitted in a direction shown by the arrow A1.

Further, in the recording apparatus 100 of the present embodiment, a configuration of a semiconductor laser 1 to be used is not limited to the configuration of the semiconductor laser shown in FIGS. 2A and 2B, and a semiconductor laser of another configuration may be used. In accordance with a wavelength of a laser beam that is used in recording of information in the recording apparatus 100, a semiconductor material of the semiconductor laser 1 is selected.

Figure 3:
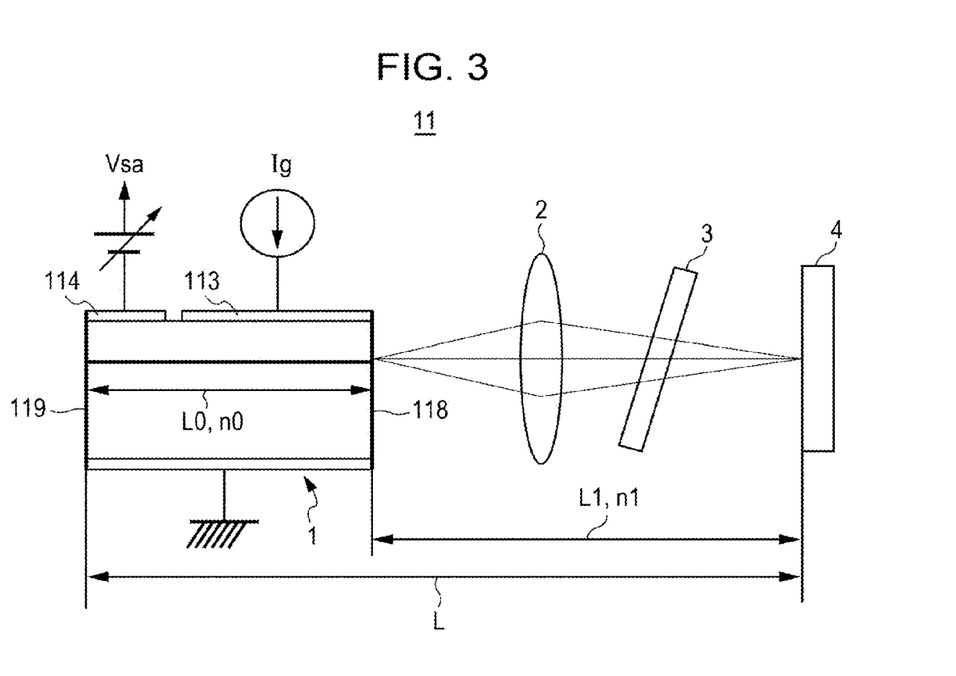
FIG. 3 is a schematic configuration diagram of a mode-locked laser unit of FIG. 1.

Next, in FIG. 3, a schematic configuration diagram of the mode-locked laser unit 11 of FIG. 1 is shown. As shown in FIG. 3, the mode-locked laser unit 11 includes the semiconductor laser 1 having the configuration shown in FIGS. 2A and 2B, and respective optical components such as a lens 2, a band-pass filter 3, and a mirror 4 through which the laser beam emitted from the semiconductor laser 1 passes. The band-pass filter 3 allows the transmission of light of a certain wavelength range, and does not allow the transmission of light outside the wavelength range. Next, an external resonator (spatial resonator) is provided between a mirror of a rear end surface of the semiconductor laser 1 and the mirror 4, so that a frequency of the laser beam emitted from the mode-locked laser unit 11 is determined by a path length L of the external resonator. Thus, it is possible to be forcibly locked to a specific frequency, and to lock a mode of the laser beam. The path length L of the external resonator may be obtained from the following Equation 1 based on a path length L0 of an internal resonator of the semiconductor laser 1, a reflective index inside the semiconductor laser 1, a path length L1 outside the semiconductor laser 1, and a reflective index n1 outside the semiconductor laser 1.

$$L = n0 \cdot L0 + n1 \cdot L1 \qquad (1)$$

The semiconductor optical amplifier 12 (SOA) is an optical modulation unit for amplifying and modulating the laser beam emitted from the mode-locked laser unit 11. The semiconductor optical amplifier 12 is a small-sized and low cost optical amplifier, and may be used as an optical gate or an optical switch that turns ON or OFF the light. In the present embodiment, the laser light emitted from the mode-locked laser unit 11 is modulated by the ON/OFF switching of the semiconductor optical amplifier 12.

Figure 4:
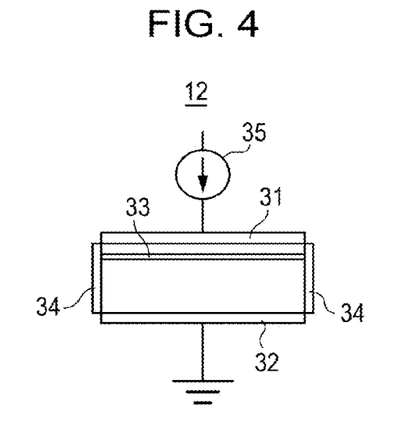
FIG. 4 is a schematic configuration diagram of a first embodiment of a semiconductor optical amplifier of FIG. 1.

In FIG. 4, a schematic configuration diagram of a first embodiment of the semiconductor optical amplifier 12 of FIG. 1 is shown. In a typical semiconductor laser, the laser light is oscillated by an optical gain due to interband transition by confining light within a resonator including mirrors of both end surfaces. With respect to this, in the semiconductor optical amplifier 12, an antireflection film 34 instead of the mirror is provided in both end surfaces as shown in FIG. 4, so that the semiconductor optical amplifier 12 operates as an amplifier for one pass by suppressing oscillation of the laser beam. In addition, similar to the semiconductor laser, the semiconductor optical amplifier 12 is configured such that semiconductor layers including an active layer 33 are stacked. Next, the semiconductor optical amplifier 12 includes an upper electrode 31 formed on an upper surface thereof, and a lower electrode 32 formed on a lower surface thereof. The upper electrode 31 is connected to a current source 35, and the lower electrode 32 is connected to a ground potential.

Figure 5A:
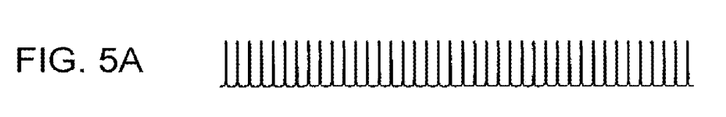
FIGS. 5A and 5B are diagrams showing input light and output light of a semiconductor optical amplifier of FIG. 1.
Figure 5B:
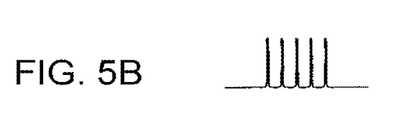

When the laser beam is incident from an incident end surface on which the antireflection film 34 is formed in a state in which a driving current is injected into the upper electrode 31 from the current source 35, the laser beam is amplified by stimulated emission while being guided through the active layer 33. In addition, by controlling an amount of the driving current that is injected into the semiconductor optical amplifier 12, it is possible to control an amount of amplification of the laser beam. However, it is not necessary to amplify the laser beam that is incident on the semiconductor optical amplifier 12, and a gain of the semiconductor optical amplifier 12 may be 1 in a case in which a sufficient laser beam power is obtained. Since carrier lifetime is short in the semiconductor optical amplifier 12 having the above described configuration, a high speed response is shown with respect to variation of current or a light intensity. Accordingly, as shown in FIG. 5A, with respect to continuous pulse light of the incident light from the mode-locked laser unit 11, pulse light with, for example, a waveform shown in FIG. 5B is obtained as output light from the semiconductor optical amplifier 12. That is, it is possible to control ON/OFF switching by a signal of the driving current, and to use the semiconductor optical amplifier 12 as a high-speed optical switch corresponding to even a frequency of the oscillation pulse from the mode-locked laser unit 11.

In a case in which the recording apparatus 100 has a configuration of emitting the laser beam having, for example, a wavelength of 407 nm from the semiconductor laser 1, the semiconductor optical amplifier 12 includes the active layer 33, a guide layer, a cladding layer, and the like which are made of the same material as that of a blue-violet semiconductor laser emitting light having the same wavelength.

Figure 6:
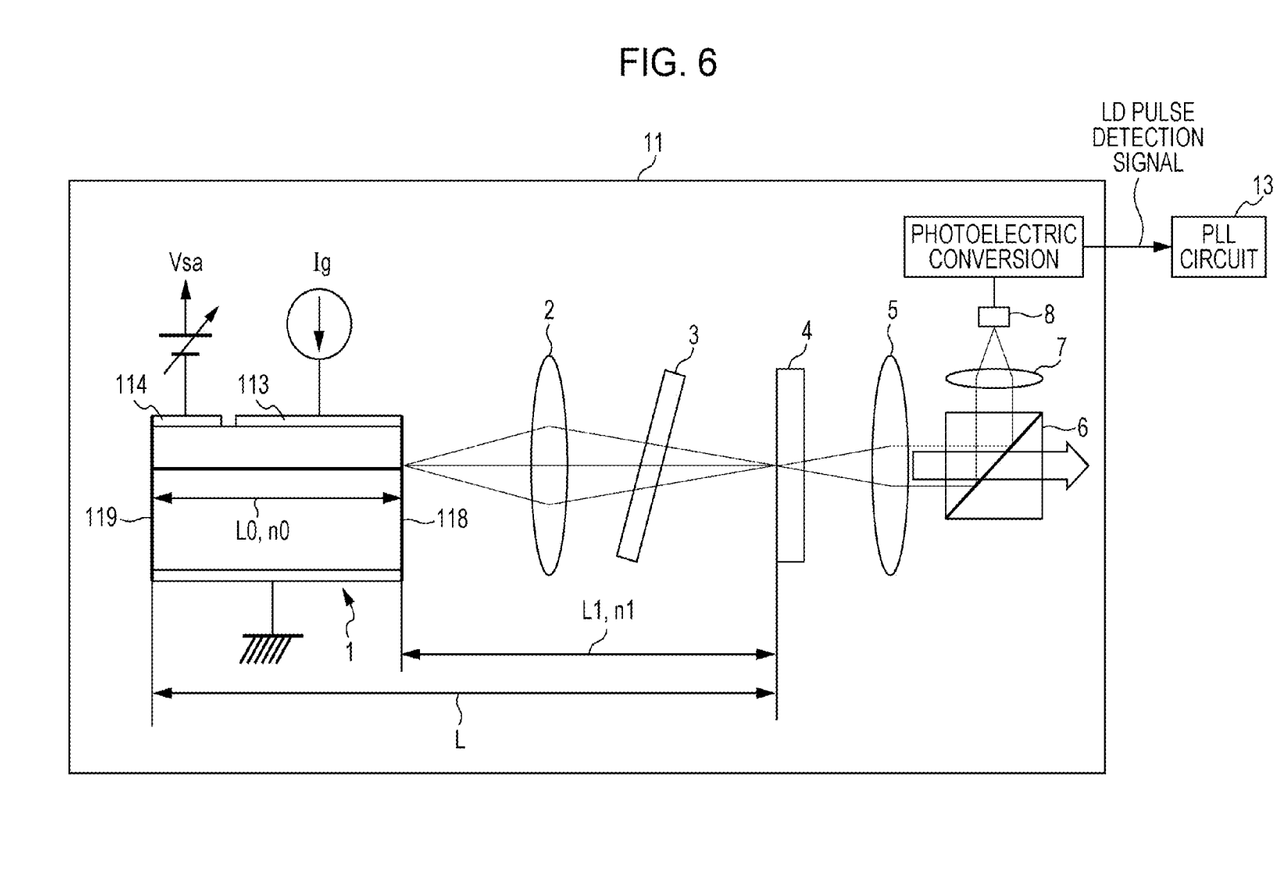
FIG. 6 is a diagram showing a configuration for obtaining an LD pulse detection signal of FIG. 1.

In the recording apparatus 100 of the present embodiment, the oscillation pulse (a laser clock; LDCLK) from the mode-locked laser unit 11 is supplied to the modulation unit 14 through the PLL circuit 13. Next, as shown in FIG. 6, a laser pulse detection signal (LD pulse detection signal) from the oscillation pulse is obtained such that a part of the light emitted from the mode-locked laser unit 11 is split by a beam splitter 6, and the split light is photoelectrically converted using a photodetector 8. Further, in FIG. 6, a collimator lens 5 is disposed in the mode-locked laser unit 11 side of the beam splitter 6, and a lens 7 is disposed in the photodetector 8 side of the beam splitter 6.

Figure 7:
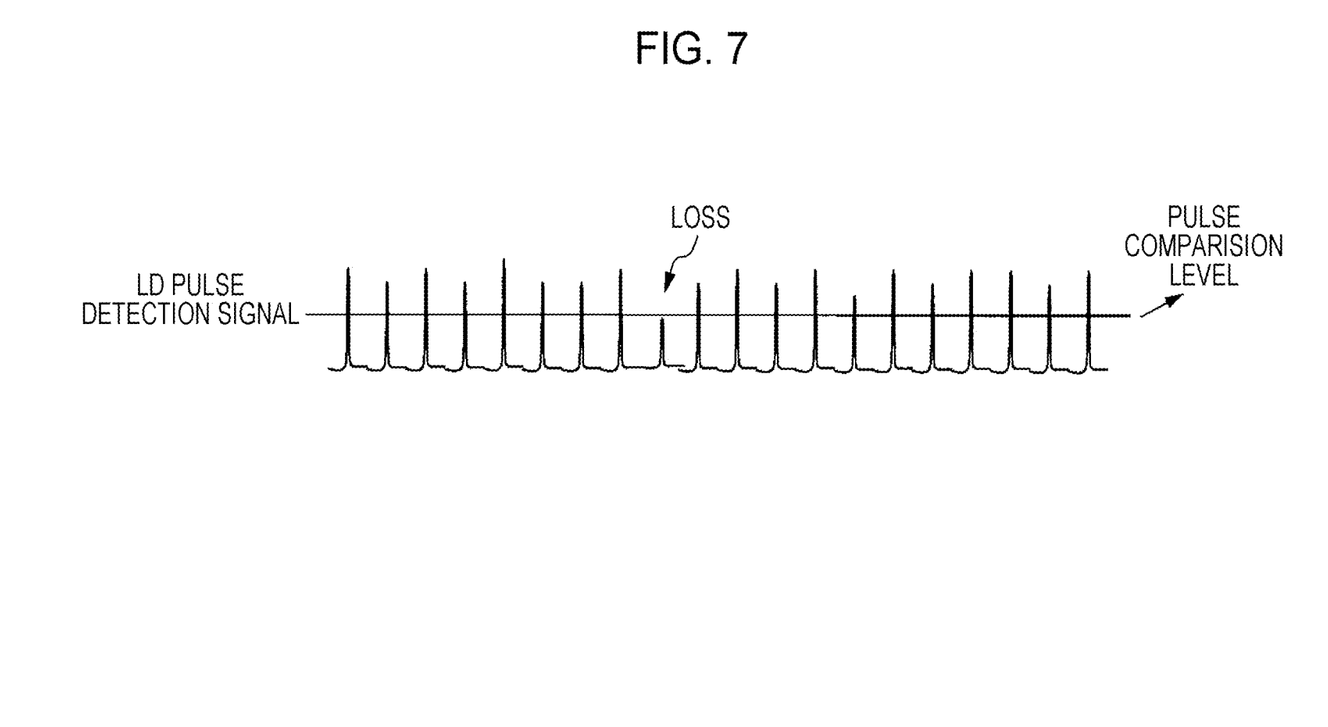
FIG. 7 is a diagram showing loss abnormality due to noise.

The PLL circuit 13 between the mode-locked laser unit 11 and the modulation unit 14 is provided to clean the laser clock (LDCLK) when loss abnormality due to noise shown in FIG. 7 occurs in a signal of the mode-locked laser unit 11. As an example of the noise causing the loss abnormality, amplitude noise or detection noise of the laser may be given. In FIG. 7, the signal is below the pulse comparison level in a place in which the loss abnormality occurs.

In addition, in a case in which a defect occurs in the mode-locked laser unit 11, an UNLOCK signal shown in FIG. 1 is supplied to the modulation unit 14 after detecting the defect by the PLL circuit 13, and an operation of the recording apparatus 100 is switched so that a clock other than the laser clock is used as a reference. Thus, it is possible to primarily avoid an abnormal operation of recording. As an example of the clock used as the reference, a drive clock (DRIVECLK) may be given.

In the recording apparatus 100 of the present embodiment, the drive clock (DRIVECLK) is created using a wobble 22 formed in an optical recording medium 21 as the reference.

Next, the drive clock (DRIVECLK) is supplied to the recording signal generation unit 16 (data generation unit) through the PLL circuit 15. In addition, in the recording apparatus 100 of the present embodiment, the drive clock (DRIVECLK) is supplied even to the modulation unit 14 in order to avoid the above described abnormal operation of recording. Further, a configuration of supplying the UNLOCK signal to the modulation unit 14 and a configuration of supplying the drive clock (DRIVECLK) even to the modulation unit 14 are not configurations that are necessary for the recording apparatus of the present disclosure. In a case in which a problem does not occur in the operation of the recording apparatus, it is possible to omit these configurations.

In the recording signal generation unit 16 (data generation unit), a data pulse is generated by putting recording data on the drive clock (DRIVECLK). The generated data pulse is transmitted from the recording signal generation unit 16 (data generation unit) to the modulation unit 14.

In the modulation unit 14, the data pulse is latched by the laser clock (LDCLK) once, and then driving current of the semiconductor optical amplifier 12 is generated as the modulated signal based on the latched data pulse. Next, the driving current is supplied from the modulation unit 14 to the semiconductor optical amplifier 12, thereby modulation-driving the semiconductor optical amplifier 12. Thus, as shown in FIGS. 5A and 5B, the laser light from the mode-locked laser unit 11 is modulated by the semiconductor optical amplifier 12, so that the modulated light is written to the optical recording medium 21.

As described above, the data pulse is latched by the laser clock (LDCLK), so that the driving current (modulation signal) supplied from the data pulse to the semiconductor optical amplifier 12 is created. Thus, it is possible to synchronize a pulse of the laser beam emitted from the semiconductor laser 1 and a modulation signal of the laser beam.

Figure 8:
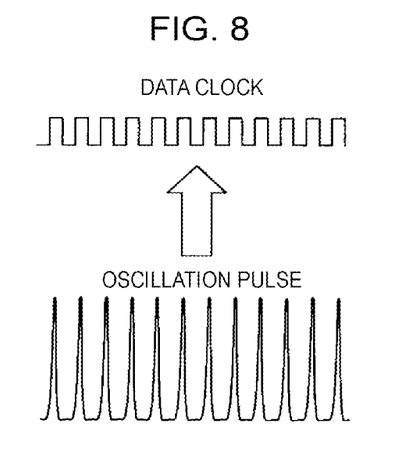
FIG. 8 is a diagram showing an oscillation pulse and a data clock in a recording apparatus of FIG. 1.

Here, in the recording apparatus of FIG. 1, the oscillation pulse and the data clock are shown in FIG. 8. As shown in a lower side of FIG. 8, the data clock is latched using the oscillation pulse of the laser beam emitted from the mode-locked laser unit 11, so that the data clock synchronized with the oscillation pulse is obtained as shown in an upper side of FIG. 8.

Figure 9:
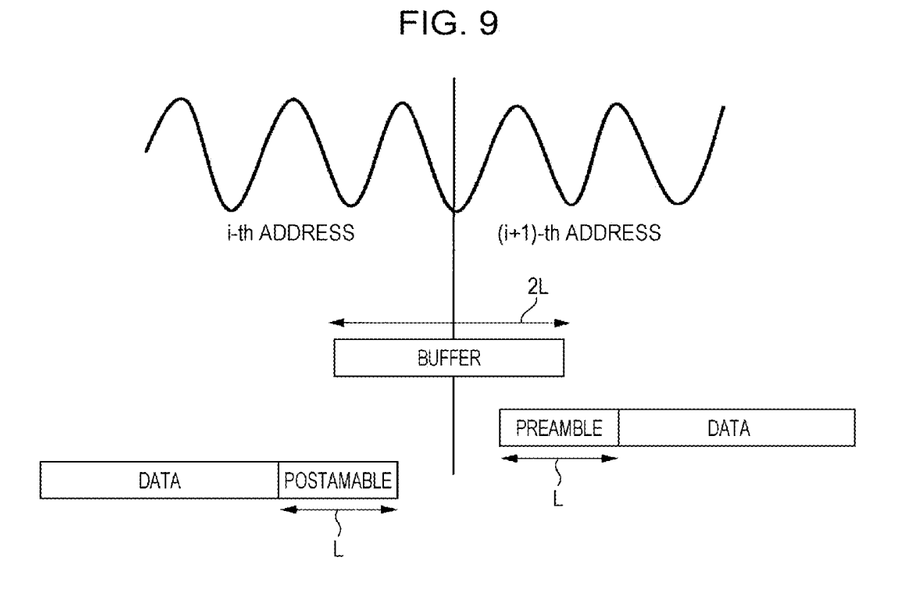
FIG. 9 is a diagram showing a configuration in which a buffer is provided at joints of each recording unit.

Further, in the recording signal generation unit 16, the data pulse is transmitted to the modulation unit 14 for each recording unit of an address of the wobble 22 detected by the drive clock (DRIVECLK), so that it is possible to synchronize a phase of the wobble 22 and the oscillation pulse of the laser beam for each recording unit. However, since the address of the wobble 22 and the oscillation pulse of the laser beam are not completely synchronized, a recording end position of the recording unit and a recording start position of the recording unit are not matched with each other. Therefore, as shown in FIG. 9, as is performed in a recording apparatus of an optical disc from the related art, a part (a so-called buffer) which is not used as recording data is provided at joints for each recording unit. For example, a preamble and a postamble in which data is absent are provided at the header and the end of the recording data, so that it is considered to eliminate the concern caused by overlapping at the joints. In FIG. 9, the preamble and the postamble are respectively provided with a length L, and a buffer having a length 2L is provided at the joints, so that the buffer corresponds to the accumulation of an address position detection error and an inter-clock error of the recording unit.

By the recording apparatus 100 of the above described present embodiment, in the recording signal generation unit 16 (data generation unit), the recording data is put on the drive clock (DRIVECLK) which uses the wobble 22 formed in the optical recording medium 21 as the reference, so that the data pulse is generated. Next, in the modulation unit 14, the data pulse is latched by the laser clock (LDCLK) once, and then the driving current of the semiconductor optical amplifier 12 is generated as the modulated signal based on the latched data pulse. Thus, it is possible to synchronize the modulation signal for driving the semiconductor optical amplifier 12 with the laser clock LDCLK. In addition, the semiconductor optical amplifier 12 is driven by the modulation signal, and the laser light emitted from the mode-locked laser unit 11 is amplified and modulated in the semiconductor optical amplifier 12, so that it is possible to synchronize the oscillation pulse of the laser beam and the modulation signal of the laser beam.

Thus, since it is possible to synchronize the oscillation pulse of the laser beam and the modulation signal of the laser beam, it is possible to readily synchronize the optical pulse of the laser beam and the modulation signal of the laser beam even in a case of the laser beam having a significantly high pulse optical frequency. Accordingly, in the recording apparatus, it is possible to accurately realize high-density and high-speed recording.

2. Second Embodiment

Next, a second embodiment of the recording apparatus of the present disclosure will be described.

Figure 10:
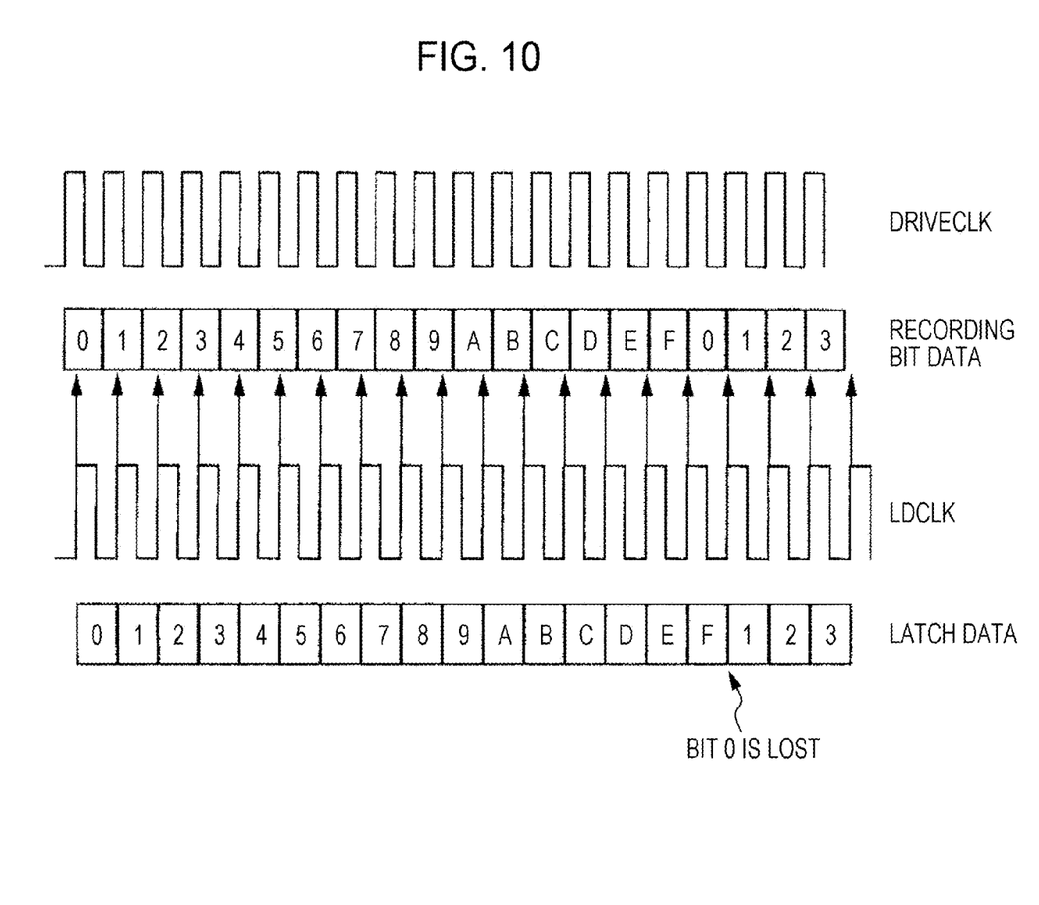
FIG. 10 is a diagram showing bit loss in a case of latching data in a bit unit.
Figure 11:
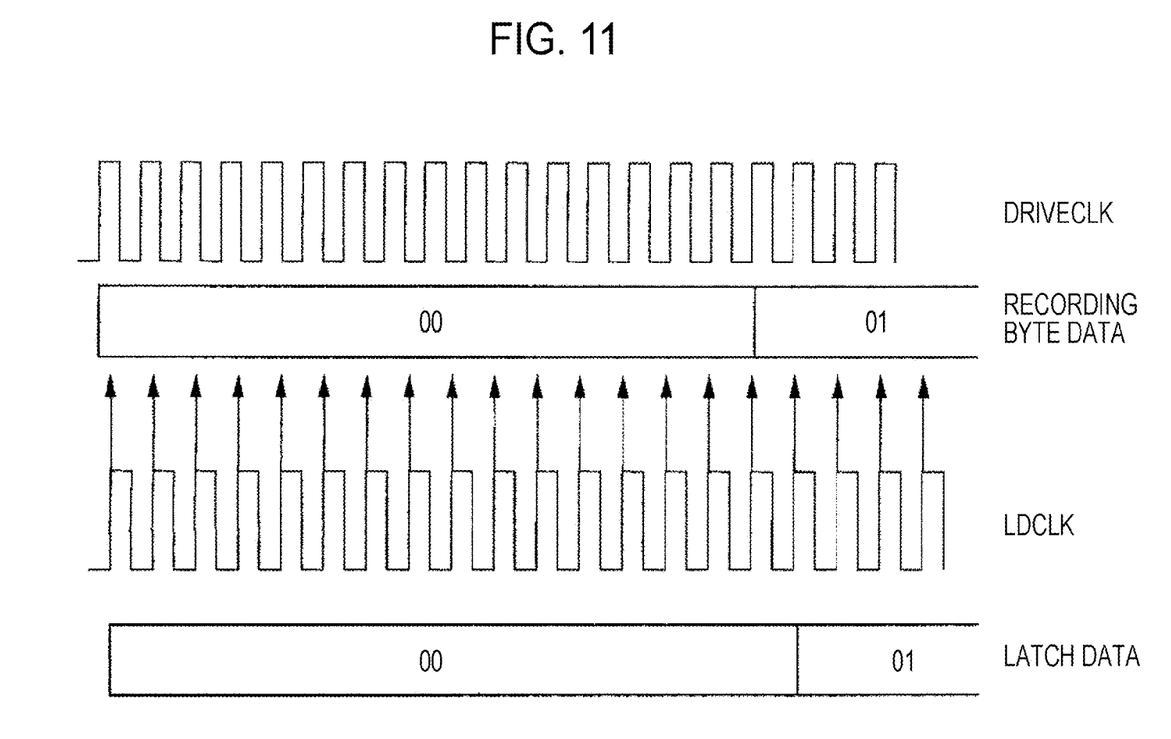
FIG. 11 is a diagram showing a case of transferring data in a two-byte unit.
Figure 12:
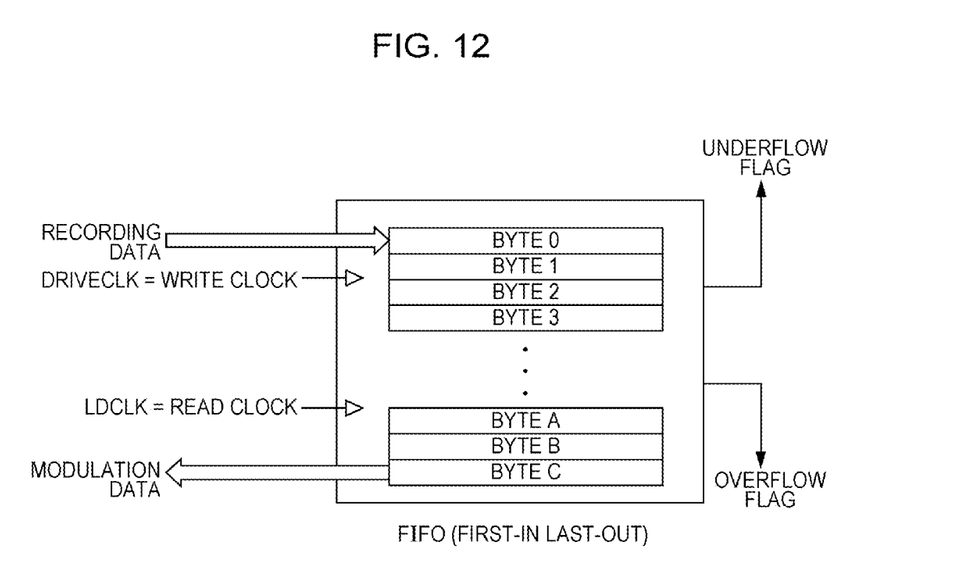
FIG. 12 is a diagram for explaining a pipeline process by a memory using an FIFO.

In the present embodiment, a memory buffer which is not shown is provided in the modulation unit 14 shown in FIG. 1. This is to prevent an error when latching data in the modulation unit 14 due to the difference between the drive clock (DRIVECLK) and the laser clock (LDCLK). As shown in FIG. 10, when latching data in a bit unit, a case of losing a bit occurs. In FIG. 10, as shown by an arrow, recording bit data is latched by the rising of a pulse of the laser clock (LDCLK), however, a bit 0 is lost by the difference between the drive clock (DRIVECLK) and the laser clock (LDCLK). With respect to this, as shown in FIG. 11, when data is transferred from the recording data generation unit to the modulation unit 14 in a two-byte unit, it is possible to reduce the loss. Consequently, in order to cancel the difference of the clock, a function of transmitting data of a word unit having a certain length, and further accumulating data by the memory buffer of the modulation unit 14 is necessary. Therefore, as shown in FIG. 12, by a memory using an FIFO (First In, and First out), a pipeline process for sequentially transmitting data of a different clock is performed. Thus, due to a difference between the drive clock (DRIVECLK) which is a write clock, and the laser clock (LDCLK) which is a read clock, a difference of a data transmission rate is absorbed. Other configurations may be performed in the same manner as that of the first embodiment described above.

In the recording apparatus of the second embodiment, more preferably, a control flag is transmitted to the drive of the optical recording medium 21 to thereby control transmission or recording when a residual amount (free space) of the memory buffer does not exist, or a capacity of the memory buffer is overflowed by the difference of the transmission rate. As an example of the control flag, UnderFlowFlag or OverFlowFlag which are shown in FIG. 12 may be given. In the recording apparatus 100 of FIG. 1, these control flags are to be transmitted, for example, from the modulation unit 14 to the recording signal generation unit 16. Thus, even in a case in which the difference of the transmission rate is great, it is possible to eliminate the omission of the recording data by controlling the transmission or the recording.

In the recording apparatus of the second embodiment, further preferably, a configuration of detecting an error of the read data by the laser clock (LDCLK), and performing cancellation or correction of writing is used. Thus, it is possible to prevent data having an error from being written in the optical recording medium 21.

By the recording apparatus of the second embodiment, it is possible to synchronize the pulse of the laser beam and the modulation signal of the laser beam in the same manner as that in the recording apparatus of the first embodiment. Thus, it is possible to readily synchronize the optical pulse of the laser beam and the modulation signal of the laser beam even in a case of a laser beam having a significantly high pulse optical frequency. Accordingly, in the recording apparatus, it is possible to accurately realize high-density and high-speed recording.

Further, by the recording apparatus of the present embodiment, the memory buffer is provided in the modulation unit 14, so that a difference of the data transmission rate due to the difference between the drive clock (DRIVECLK) and the laser clock (LDCLK) is absorbed. Thus, even though the difference of the data transmission rate due to the difference between the drive clock (DRIVECLK) and the laser clock (LDCLK) is generated, omission in recording data is prevented, and recording is accurately performed.

In the recording apparatus of the respective embodiments described above, a configuration in which the used optical recording medium 21 is disc-shaped, and recording of information is performed by rotating the optical recording medium 21 is used, however, the present disclosure may be applied to a recording apparatus having other configurations. For example, a configuration in which information is recorded on the optical recording medium by scanning the laser beam with respect to a card-shaped optical recording medium may be used.

In addition, in the recording apparatus of the above described respective embodiments, the drive clock (DRIVECLK) is created using the wobble 22 formed in the optical recording medium 21 as the reference. In the present disclosure, the reference signal from the drive of the optical recording medium is not limited to the signal using the wobble 22 as the reference, and a signal having another configuration may be used as the reference signal from the drive. For example, a configuration for a reference of another address may be provided in the optical recording medium instead of the wobble 22, and the reference signal from the drive may be created using the configuration for the reference.

The present disclosure is not limited to the above described embodiments, and a variety of configurations thereof is obtained without departing from the scope of the present disclosure.

The present disclosure contains subject matter related to that disclosed in Japanese Priority Patent Application JP 2010-204838 filed in the Japan Patent Office on Sep. 13, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus that records information on an optical recording medium, the recording apparatus comprising:

a mode-locked laser unit that includes a semiconductor laser emitting a laser beam for recording the information on the optical recording medium, and an external resonator;

an optical modulation unit that amplifies and modulates the laser beam emitted from the mode-locked laser unit;

a recording signal generation unit that generates a recording signal based on a reference signal from a drive of the optical recording medium; and a modulation unit that generates a modulation signal for driving the optical modulation unit by latching the recording signal using a laser clock generated by an oscillation pulse of the laser beam emitted from the mode-locked laser unit.

2. The recording apparatus according to claim 1, wherein the reference signal from the drive is a signal obtained from a wobble formed on the optical recording medium.

3. The recording apparatus according to claim 1, further comprising:

a memory buffer that is provided in the modulation unit, and absorbs a difference of a data transmission rate due to a difference between the reference signal from the drive and the laser clock.

4. The recording apparatus according to claim 3, wherein, when a residual amount of the memory buffer does not exist, or a capacity of the memory buffer is overflowed, a flag is sent to the drive of the optical recording medium to thereby control transmission or recording by the difference of the data transmission rate.

* * * * *